J. F. FLAHERTY.
GAGING MACHINE.
APPLICATION FILED FEB. 4, 1914.

1,133,273.

Patented Mar. 30, 1915.
7 SHEETS—SHEET 5.

UNITED STATES PATENT OFFICE.

JOHN F. FLAHERTY, OF CANTON, OHIO, ASSIGNOR TO THE TIMKEN ROLLER BEARING COMPANY, OF CANTON, OHIO, A CORPORATION OF OHIO.

GAGING-MACHINE.

1,133,273.

Specification of Letters Patent.

Patented Mar. 30, 1915.

Application filed February 4, 1914. Serial No. 816,648.

*To all whom it may concern:*

Be it known that I, JOHN F. FLAHERTY, a citizen of the United States, and a resident of the city of Canton, county of Stark, and State of Ohio, have invented a new and useful Improvement in Gaging-Machines, of which the following is a specification.

This invention relates to gaging machines, and has for its principal objects to provide a machine which is capable of automatically gaging the taper of bearing rollers and similar parts, and to attain certain advantages hereinafter appearing.

The invention consists in the parts and in the arrangements and combinations of parts hereinafter more fully set forth.

In the accompanying drawings, which form part of the specification, and in which like reference characters refer to like parts in the several views.

The machine comprises a stand 1 on which is mounted a cylindrical body 2. Upon the top of this body is formed a circular table 3 having near its center, an upwardly extending cylindrical boss 4. Located eccentrically in the boss 4 is a vertical cylindrical bearing 5 formed of two parts 6 and 7, one part 7 being adjustable by the adjusting screws 8 for the reasons hereinafter stated. Having its center line in a vertical line with the center line of the bearing 5 is a second cylindrical split bearing 9 mounted in a sleeve 10 which is supported by webs 11 extending inwardly from the outer shell of the cylindrical body 2. This bearing 9 is provided with adjusting screws 12.

Mounted in the bearings 5 and 9 is a shaft 13 which is free to move vertically. Mounted upon the shaft 13 is a collar 14 adjustably secured thereto by means of set screws 15 and provided with clutch teeth 16 having vertical faces. Loosely mounted upon the shaft 13 is a worm gear 17 carrying a clutch member 18 which has teeth 19 similar to the teeth 16 having vertical faces adapted to engage the vertical faces of clutch teeth 16. The worm gear 17 is engaged by a worm pinion 20 fixedly secured upon a drive shaft 21. The drive shaft 21 is mounted at one end in bearings 22, one upon each side of the worm pinion, which are formed integral with the webs 11 of the cylindrical body 2. The other end of the drive shaft 21 is supported in a cylindrical bearing 23 integral with the cylindrical body 2 and extending beyond the outside face of said cylindrical body. The drive shaft 21 is rotated by a driving pulley 24 mounted upon its outer end, and capable of being connected and disconnected with the drive shaft 21 by a spring-operated friction clutch 25 of an ordinary type.

Figure 1:
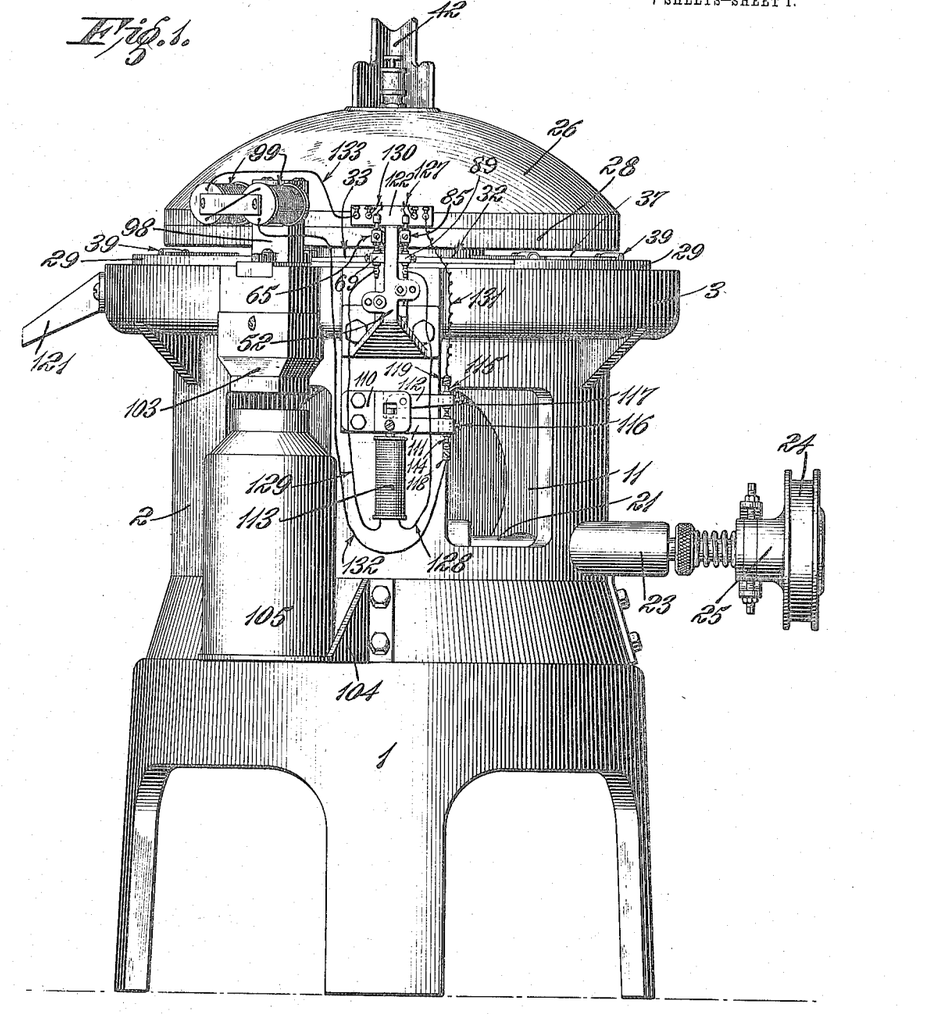
Figure 1 is a side elevation of a machine embodying my invention.
Figure 2:
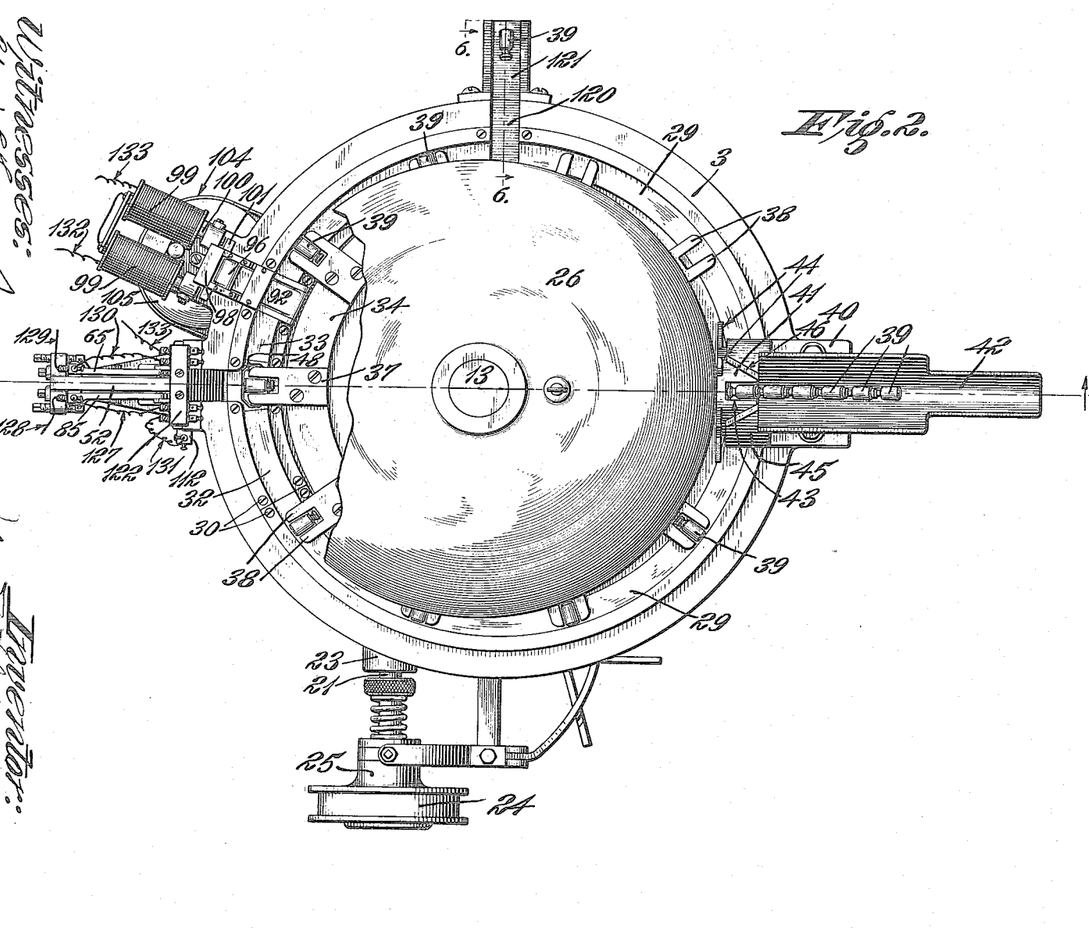
Fig. 2 is a top plan view with part of the dome broken away.
Figure 3:
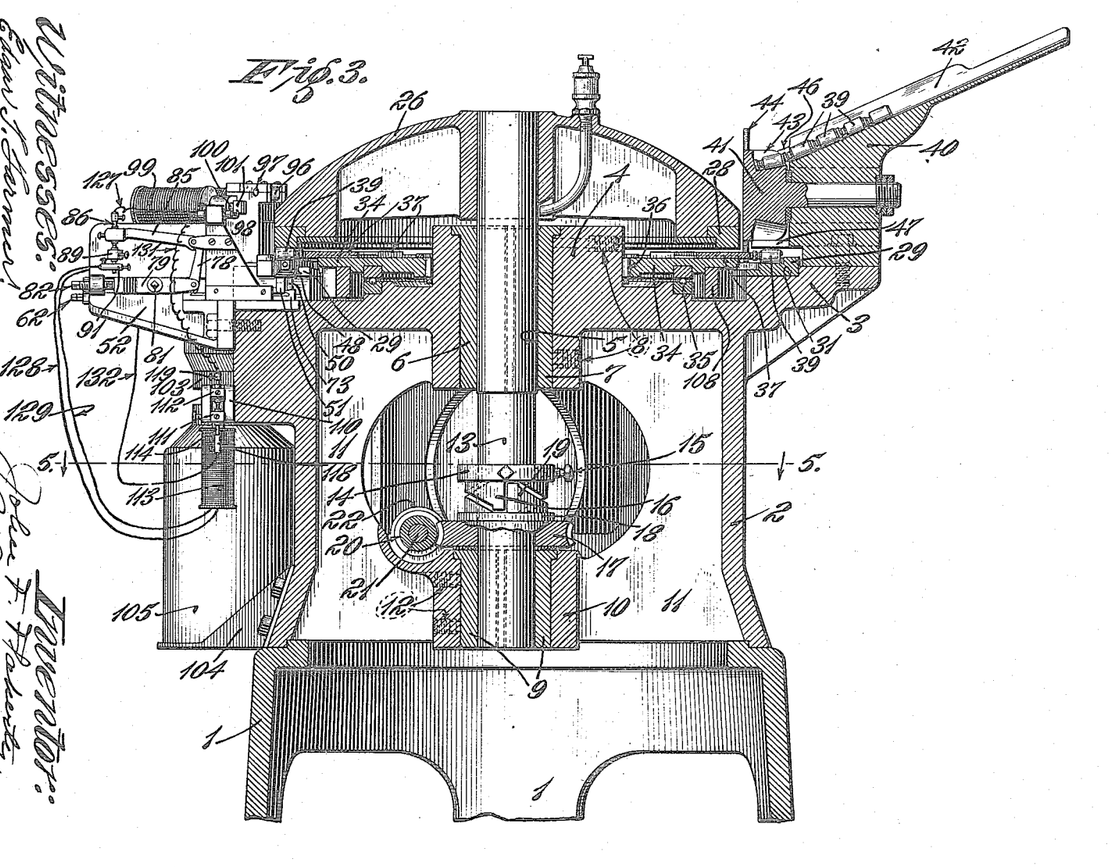
Fig. 3 is a vertical section taken on the line 3—3 of Fig. 2.
Figure 4:
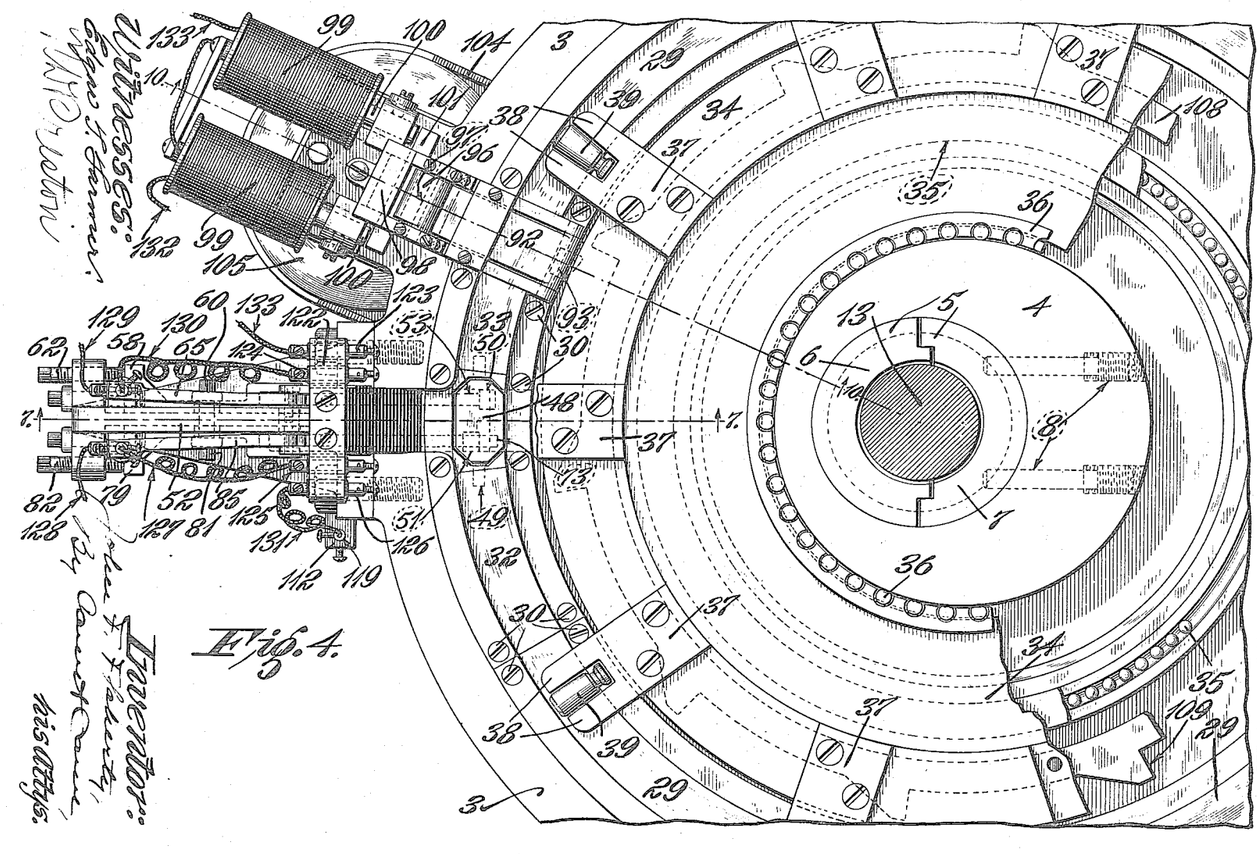
Fig. 4 is a top plan view with the dome removed and parts broken away.
Figure 5:
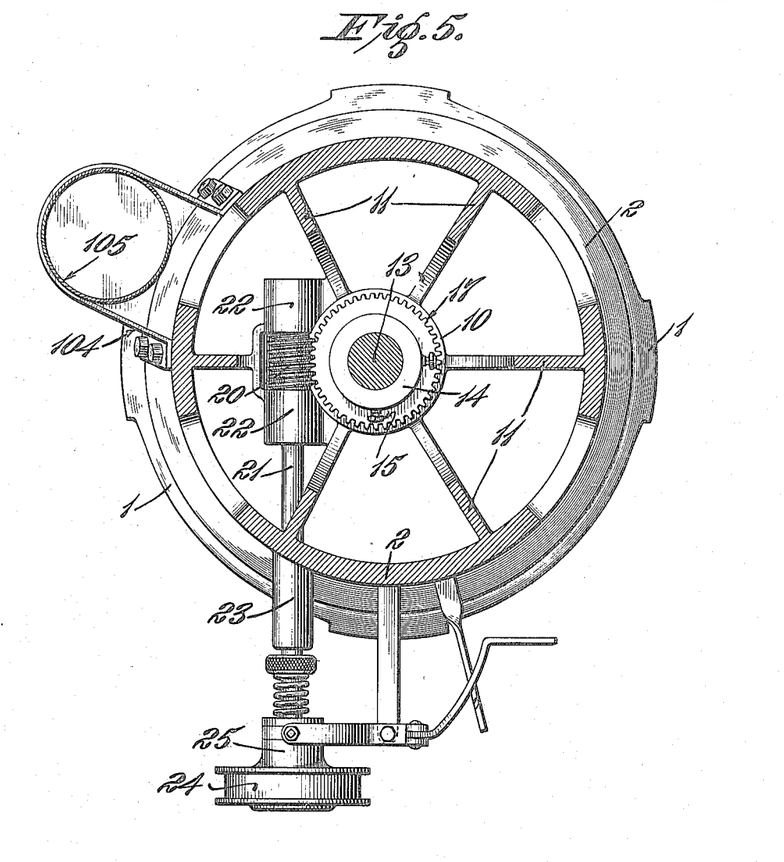
Fig. 5 is a horizontal section taken on the line 5—5 of Fig. 3.
Figure 6:
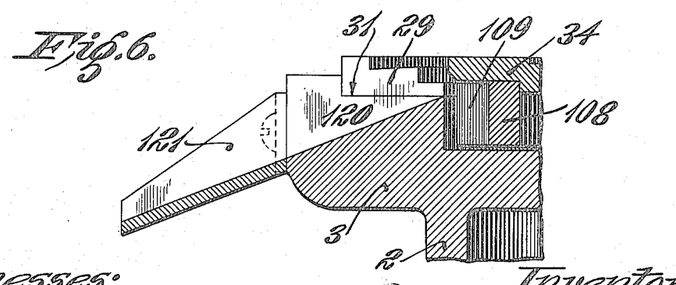
Fig. 6 is a detail section taken on the line 6—6 of Fig. 2.
Figure 7:
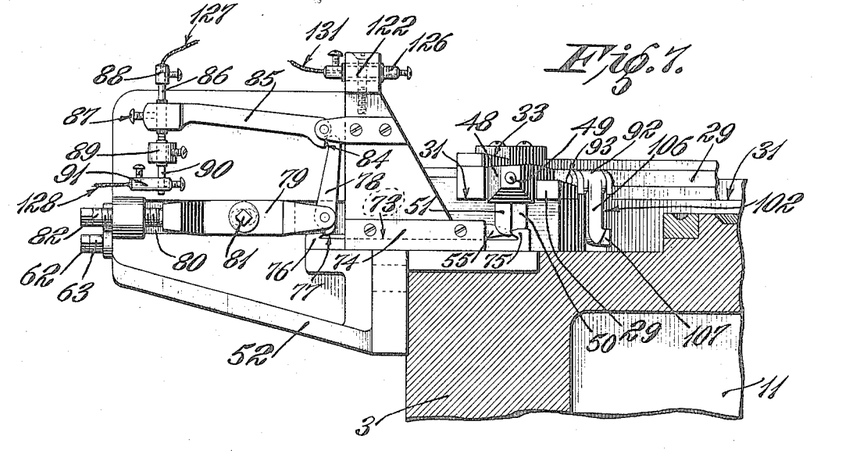
Fig. 7 is a detail section showing in side elevation the gaging block and its associated mechanism, the view being taken on the line 7—7 of Fig. 4, certain parts being shown in elevation.

Upon the end of the shaft 13 is fixed a dome 26 which is fixedly secured to the shaft 13, preferably by being pressed on, and which has a hardened steel rim 28 lying in a horizontal plane. Concentric with the boss 4 is a circular way 29 secured by screws 30 in a recess 31 in the top of the table 3. The major portion of this way 29 is disposed in a horizontal plane parallel to the lower face of the rim 28. The remaining portion of the way 29 (preferably about one-sixth of the total circumferential length of the way) is formed with slight upward and downward inclines 32 and 33 merging at their upper edges into a short horizontal portion approximately in the line of the centers of the boss 4 and the shaft 13 (as shown to the best advantage in Fig. 1).

Mounted concentrically about the boss 4 is a carrier 34 which is substantially in the form of an annular plate and is supported upon an annular ball bearing 35. Between the carrier 34 and the boss 4 is a roller bearing 36. Arranged at equal distances around the outer circumferential edge of the carrier 34 are secured a number of carrier arms 37. These carrier arms 37 are in the form of slotted plates and have a pair of fingers 38 adapted to receive a roll 39 between them.

Arranged substantially on the line of the centers of the boss 4 and shaft 13 is a bracket 40 which carries the feeding mechanism. This feeding mechanism comprises a cylindrical head 41, mounted for rotation under the discharge end of the upwardly inclined feed trough 42. This head 41 is formed with a series of recesses 43 in its circumferential face and is provided with an extending arm 44 for each recess. The recesses 43 are each adapted to receive a roller 39. Surrounding the circumferential face of this head is a casing 45, having an opening 46 at its top and an opening 47 at its bottom. The head 41 is mounted so that the extending arms 44 extend across the plane of movement of the fingers 38 of the carrier arms 37.

The gaging mechanism comprises a gaging block 48 which is located at the side of the machine opposite to the feed mechanism at the highest point of the inclines 32 and 33, and approximately on the line of the centers of the boss 4 and the shaft 13. The gaging block 48 is placed in a cut-out portion of the way 29 and its upper surface lies in the plane of the upper surface of the way. The gaging block 48 is mounted centrally on horizontal pivots 49 which are disposed in a line parallel to a tangent to the way 29 at this point. The gaging block 48 has two spaced downwardly extending lugs 50 and 51, one being on each side of the pivot axis.

Secured to the cylindrical body 2 is a bracket 52 which supports the parts of the gaging mechanism associated with the gaging block 48. A square rod 53 mounted in a guide 54 in the bracket 52 has its ends 55 and 56 beveled to form sharp edges. One end 55 of the square rod 53 contacts with the lug 50 and the other end 56 bears against a lever 57. The lever 57 is pivoted at a point below the point where the end 56 of the rod 53 bears against it, to a slide 58. The slide 58 is mounted in a guideway 59 and is held in position by a bolt 60 passing through an elongated hole 61 in it. Screw threaded into the bracket 52 is an adjusting bolt 62 which bears against the end of the slide 58, and passing loosely through the bracket 52 is another adjusting bolt 63 which is screw-threaded into the end of the slide 58. The free end of the lever 57 bears against a shoulder 64 on a lever 65. This lever 65 is pivoted at a point adjacent to the shoulder 64 and at the other end carries a contact member 66 insulated therefrom which is adjustably secured therein by a set screw 67. The contact member 66 is provided with any suitable form of wire attaching means, such as a binding sleeve 68. A lug 69 is formed integral with the bracket 52 (see Fig. 1) and projects to a point directly below the contact member 66. Adjustably secured in this lug 69 by a set screw 70 insulated therefrom is a contact member 71 provided with a binding sleeve 72.

A square rod 73 is mounted in a guide 74 in the bracket 52 and has its ends formed with sharp-edged hooks 75 and 76. The hook 75 at one end of the square rod 73 engages the lug 51 and the hook 76 at the other end engages a shoulder 77 formed on a lever 78. The lever 78 is pivoted to a slide 79 which is adjustably mounted in a guideway 80 by a bolt 81 in the same way as the slide 58 and is provided with adjusting screws 82 and 83. The free end of the lever 78 engages a shoulder 84 formed on a lever 85 which is pivoted at a point adjacent to said shoulder 84 on the bracket 52. The free end of this lever 85 carries a contact member 86 insulated therefrom and adjustably secured therein by a set screw 87. The contact member 86 is provided with a binding sleeve 88. Disposed below the contact member 86 is a lug 89 integral with the bracket 52 and in this lug 89 is adjustably secured a contact member 90 insulated therefrom and provided with a binding sleeve 91.

Figure 10:
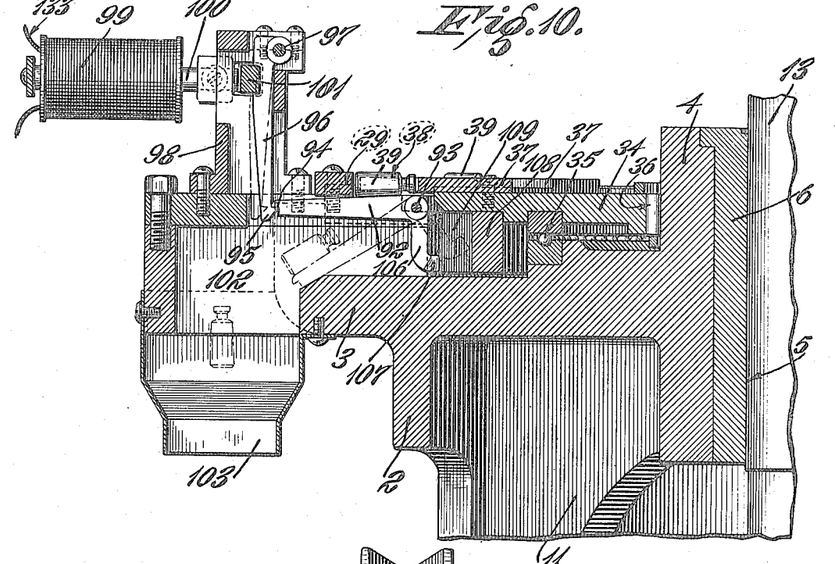
Fig. 10 is a detail section of the trap door and its associated mechanism, the line of section being indicated by the line 10—10 on Fig. 4, certain parts being shown in elevation.
Figure 11:
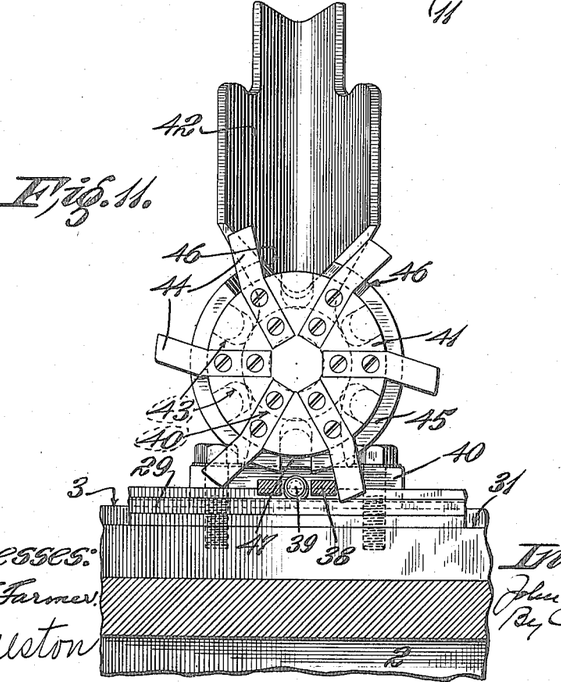
Fig. 11 is a detail end elevation of the feeding mechanism.

In the way 29, at a point beyond the gaging block 48 in the direction of the rotation of the dome 26 and carrier 34, is placed a trap door 92. The upper surface of the trap door 92 lies in the plane of the upper surface of the way 29, so that when the trap door 92 is closed, a smooth path over the trap door is furnished. The trap door 92 is mounted on pivots 93 near the inner edge of the way 29, and in its open position, shown in dotted lines in Fig. 10, slants sharply downwardly. The free end of the trap door 92 is formed with a sharp edge 94, and this edge is engaged by a hook-shaped catch 95 on the end of a trip lever 96. The trip lever 96 is mounted at its upper end on a pivot shaft 97 in a standard 98 secured to the cylindrical body 2. Fastened to the standard 98 is a pair of electromagnets 99, the pole pieces 100 of which extend through the standard 98 and have their ends adjacent to an armature 101 secured to the trip lever 96. The trap door 92 opens into a chamber 102 having in its bottom a discharge chute 103. Upon a suitable bracket 104 is supported a receptacle 105, into which the chute 103 is adapted to discharge rolls.

At the pivot end of the trap door 92 is an integral arm 106 which extends downwardly and terminates in a beveled end 107. Fastened to the under side of the carrier 34 is an annular member 108 having a series of integral projections 109. Each projection 109 is beveled on the face which is directed in the direction in which the carrier 34 revolves. When the trap door 92 is in its open position, the arm 106 extends out into the path of movement of the projections 109. There is one projection 109 for each carrier arm 37, and it is placed so that, after its carrier arm 37 has passed by the trap door 92, its beveled face will engage the beveled end 107 of the arm 106 of the trap door 92 and raise the trap door to its closed position, where it is latched by the trip lever 96.

Secured to the cylindrical body 2 below the gaging block 48 and its associated mechanism, is an angle bracket 110. The bracket 110 carries a fixed arm 111 and a pivoted arm 112 disposed one above the other. Secured to the bracket 110 is a relay magnet 113, the pole piece of which is adjacent to the inner end of the pivoted arm 112. The arms 111 and 112 carry at their ends contact members 114 and 115 insulated therefrom, adjustably held in position by set screws 116 and 117 and provided with binding sleeves 118 and 119.

At a point beyond the trap door 92 in the direction of rotation of the dome 26 is a recess 120 in the way 29 and this recess 120 leads to a chute 121. Any of the rolls 39 which have passed the trap door 92 drop by their own weight between the fingers 38 of the carrier arms 37 into this recess 120 and are carried by the chute 121 into any suitable form of receptacle, which is not shown.

The contact members of the levers 65 and 85 and the relay magnet 113 are electrically connected together in series to any suitable form of electrical energy, such as a battery. The battery being of a conventional form, is not shown. As a convenient means for attaching the wires, an insulated block 122 is mounted upon the bracket and is provided with binding posts 123, 124, 125, 126. The electrical circuit connecting the contact members of the levers 65 and 85 and the relay magnet 113 is as follows: from one pole of the battery to the binding post 125, the conductor 127, binding sleeve 88, contact member 86, contact member 90, binding sleeve 91, conductor 128, relay magnet 113, conductor 129, binding sleeve 72, contact member 71, contact member 66, binding sleeve 68, conductor 130, binding post 124, back to the other pole of the battery. The electro-magnets 99 are connected to the relay contact members 114 and 115 by the following circuit: from one pole of the battery to the binding post 126, conductor 131, binding sleeve 119, contact member 115, contact member 114, binding sleeve 118, conductor 132, electro-magnets 99, conductor 133, binding post 123, and back to the other pole of the battery.

Figure 8:
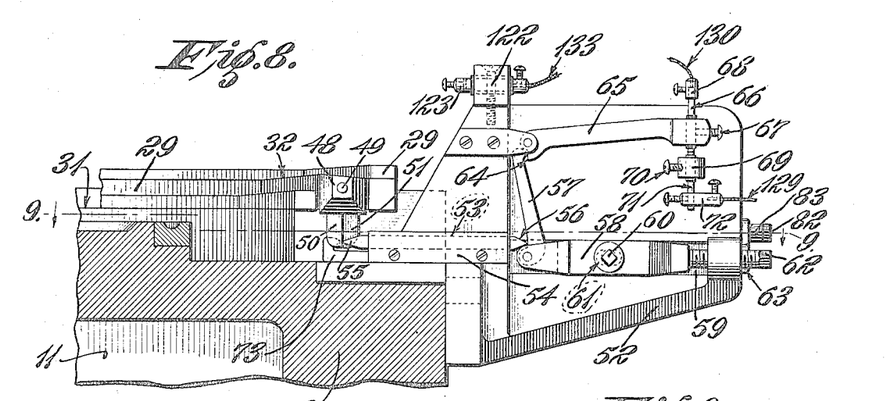
Fig. 8 is a detail section showing in side elevation the gaging block and its associated mechanism on the side opposite to the side shown in Fig. 7.
Figure 9:
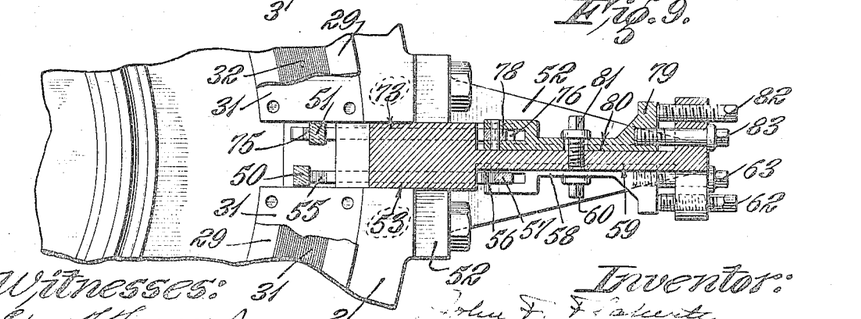
Fig. 9 is a horizontal detail section of the mechanism associated with the gaging block, the line of section being indicated by the line 9—9 on Fig. 8.

In the operation of the machine, the rolls to be gaged are placed in the feed trough 42 end to end. The bottom roll in the trough 42 enters one of the recesses 43 in the cylindrical head 41. The carrier 34 is now turned by hand (or otherwise) and one of the carrier arms 37 engages the lower extending arm 44 on the cylindrical head 41 and rotates the said head to bring the next recess 43 opposite the discharge end of the feed trough 42. The second roll now falls by gravity into this latter recess and the next carrier arm 37 engages the next extending arm 44 on the cylindrical head 41 to rotate the head and to bring the next recess in position. This operation continues as the carrier 34 is revolved. The rolls are retained in the recesses 43 in the cylindrical head 41 by the casing 45 until a recess comes opposite to the bottom opening 47 whereupon the roll in that recess is free to drop between the fingers 38 of the carrier arm 37 which is in position to receive it. In this manner, the rolls placed in the feed trough 42 are fed one by one between the fingers 38 of the carrier arms 37 as the carrier 34 is revolved. In commencing the operation of the machine, it is necessary to rotate the carrier 34 by hand until the rolls are carried to a point where one of them comes under the rotating dome 26; whereupon the weight of the dome bearing upon the rolls serves to roll the rolls along the way 29 and carry with the rolls the carrier arms 37. In this way, after the carrier 34 has been partly filled by rotating the carrier by hand, a further rotation of the carrier is accomplished by the rotation of the dome 26. Considering the cycle of operation with reference to one of the rolls,— as the roll 39 approaches the gaging block 48 it rolls up along the upward incline 32, and at the top of the incline 32 passes along to the gaging block 48. When the roll 39 is on the gaging block 48, the dome 26 is raised so that it bears on this roll 39 alone. By reason of this fact, it is certain that each roll 39 will be gaged independently of the other rolls. The roll 39, while it is on the gaging block 48, is pressed firmly against the block by the weight of the dome 26; and in case the roll 39 is not of the correct taper, the gaging block will be turned on its pivots 49 an amount depending on the amount that the roll varies from the correct taper. If the gaging block 48 is turned in one direction, the lug 50 carries with it the square rod 53, and the free end of this rod, by moving the lever 57 and the lever 65, raises the contact member 66 out of contact with the contact member 71. Likewise, if the gaging block 48 is turned in the other direction, the lug 51 carries with it the square rod 73, and the other end of this rod, by moving the lever 78 and the lever 85, raises the contact member 86 out of contact with the contact member 90. Thus, whichever direction the gaging block 48 is turned, the circuit through the relay magnet 113 is broken. As the circuit through the relay magnet 113 is broken, it is deënergized, and the pivoted arm 112 falls by its own weight so as to bring the contact members 114 and 115 in contact. This completes the circuit through the electro-magnets 99 and energizes them. The electro-magnets 99 being thus energized, the armature 101 is attracted to the pole pieces 100 and the trip lever 96 is drawn out of engagement with the sharp edge 94 of the trap door 92. The trap door 92 is now released, and drops by its own weight to the open position, as indicated in dotted lines in Fig. 8. The roll 39 is now carried by the carrier 34 downward along the incline 33 to the open trap door 92, through which it falls down the chute 103 to the receptacle 105. After the carrier arm 37 has passed by the open trap door 92, the adjacent projection 109 upon the annular member 108 engages the beveled end 107 of the arm 106 of the trap door 92 and raises it to its closed position. In the meantime, the weight of the levers 85 or 65 has returned the gaging block 48 to its normal position and restored normal conditions in the circuits through the relay magnet 113 and through the electro-magnets 99, so that when the trap door 92 is raised the trip lever 96 is free to latch it closed. The trap door 92 is closed and latched before the next roller 39 reaches the gaging block 48. In this manner, all rolls which are not of the correct taper are separated and dropped into the receptacle 105.

In case the roll 39 passing over the gaging block 48 is of the correct taper, the gaging block 48 will not be moved and the trap door 92 will remain closed so that the roll may pass smoothly over it. After passing the closed trap door 92 the roll 39 is carried around to the recess 120 where it is discharged into any suitable form of receptacle. By means of the adjusting screws 62, 63 and 82, 83 either of the slides 58 or 79 may be adjusted to make any desired degree of looseness between the points of engagement of the rods 53 and 73 and the levers 57, 65 and 78, 85. By this adjustment, it is possible to permit the gaging block 48 to have a certain amount of movement before it affects the electrical circuit through the relay magnet 113. In this manner, rolls may be gaged for any desired limits of taper. Also, in the gaging mechanism, the levers 57, 65 and 78, 85 are fulcrumed so as to increase the amount of movement of the contact members 66 and 86 as compared to the amount of movement of the gaging block 48. By this construction, it is possible to secure sufficient movement at the contacts 66 and 86 to break the circuit with a very slight movement of the gaging block 48 so that the machine is capable of being made to gage very small differences in taper. When a roll is on the gaging block 48, the dome 26 is supported vertically only at this point. This tends to tilt the shaft 13, and after some time the bearings 5 and 9 will wear. The adjusting screws 8 and 12 are placed in the upper bearing 5 on the opposite side to the side facing the gaging block 48, and in the lower bearing 9 on the same side. By this construction, the bearings 5 and 9 may be adjusted for any wear, and the correct alinement of the shaft 13 maintained.

This machine may be used to gage the taper of rolls irrespective of their size, because the dome 26 may move vertically to accommodate the different sizes. To permit the shaft 13 which carries the dome 26 to move vertically freely, the faces of the engaging clutch teeth 16 and 19 are made to extend vertically. The way 29 is inclined radially at an angle approximately equal to the angle of the taper of the rolls to be gaged, so that the top circumferential faces of the rolls when they are on the way lie in a horizontal plane. The rim 28 of the dome 26 has its lower face horizontal. By this construction, it is possible to remove the way 29 by taking out the screws 30 and to place another one in its place when it is desired to gage rolls having a different taper. The gaging block 48 and the trap door 92 are also adjusted or changed to correspond to the different taper. Moreover, the way 29 may have its upper surface in a horizontal plane and cylindrical rolls may be gaged. As the machine operates in the same manner when cylindrical rolls are gaged as when tapered rolls are gaged, it is obvious that my invention is not restricted in its use to the gaging of tapered rolls. The gaging block 48 breaks a normally closed circuit instead of completing a normally open circuit. This makes it certain that the operating conditions in the circuit are normal, otherwise the trap door 92 will open and remain open, and all of the rolls will drop through, indicating to the attendant that the machine is not operating properly.

Obviously, the machine which I have shown and described as embodying my invention is susceptible of considerable modification without departing from the spirit of my invention. I do not wish, therefore, to be limited to the particular form of machine shown and described.

What I claim is:

1. In a gaging machine, a circular way, a carrier adapted to guide rolls around said way at fixed distances apart, said rolls rolling on said way, means controlled by said carrier for feeding rolls thereto, a gaging block pivoted in said way, a trap door in said way over which each of said rolls passes after passing over said gaging block, means operable by said gaging block for opening said trap door, a chute for discharging from said way the rolls passing said gaging block and said trap door, and a revolving dome bearing on said rolls.

2. In a gaging machine, a horizontal circular way, a gaging member pivoted in said way, means for guiding rolls along said way at fixed distances apart, means for discharging from said way each of said rolls that move said gaging member, and a rotating dome freely movable vertically and adapted to bear normally on the rolls on said way, said way having its surface raised at the place where said gaging member is located, so that when a roll is on said gaging member said dome bears solely upon that roll.

3. In a gaging machine, a way, a carrier for rolling rolls along said way, a gaging block located along said way in position to be engaged by the rolls successively, said gaging block being pivoted on an axis extending longitudinally of said way, a discharge opening from said way adjacent to said gaging block, a door controlling said discharge opening, electrically controlled means operated by said gaging block for opening said door to discharge the roll operating said gaging block, and means on said carrier for closing said door.

4. In a gaging machine, a circular way, a carrier having arms to receive rolls and guide said rolls on said way at fixed distances apart, a feed mechanism for feeding rolls to said carrier arms, a rotating dome free to move vertically and engaging said rolls to roll said rolls along said way, said way having its surface raised at one point, and means for gaging the taper of said rolls, said gaging means being located at the uppermost point on said way.

5. In a gaging machine, a way, means for rolling rolls along said way, a pivoted gaging member located at a point along said way, means located at a point beyond said point in the direction of travel of said rolls for removing a roll from said way, said means being controlled by said gaging member, and a chute for discharging from said way the rolls passing said gaging member and said means.

6. In a gaging machine, a member mounted to move in a plane perpendicular to the plane of its surface, a gaging member mounted to move relative to said member in a direction to change the relative angular positions of the planes of the surfaces of said member and said gaging member, means operable by said gaging member in moving a predetermined distance for automatically separating the rolls moving said gaging member from the other rolls, and means for positioning rolls between said member and said gaging member.

7. In a gaging machine, a way, a gaging member in said way, means for carrying rolls along said way and over said gaging member, said gaging member being pivoted on an axis extending longitudinally of said way, said means operating to press said rolls against said gaging member, and means operable by said gaging member in moving for separating the rolls that move said gaging member from the other rolls.

8. In a gaging machine, a way, means for carrying rolls along said way, a gaging member in said way engaged by said rolls in their movement along said way and movably mounted on an axis extending longitudinally of said way and means operable by said gaging member in moving for automatically separating the rolls moving that move said gaging member from the other rolls.

9. In a gaging machine, a way, means for rolling rolls along said way, a gaging member located along said way in position to be engaged by the rolls successively, said gaging member being pivoted on an axis extending longitudinally of said way, and electrically controlled means operated by said gaging member for removing from said way each of said rolls operating said gaging member.

10. In a gaging machine, a gaging member pivoted on a transverse axis, means for intermittently placing rolls one at a time in contact with said gaging member with the axis of each roll extending longitudinally of said gaging member, and means for separating the rolls operating said gaging member from the other rolls.

11. In a gaging machine, a pivoted gaging block, levers operatively connected to said block on each side of the pivot axis thereof, said levers being fulcrumed to multiply the amount of movement of said block, and a trap door controlled by the movement of said levers.

12. In a gaging machine, a pivoted gaging block, a trap door, and means for opening said trap door operated by said gaging block in moving in either direction about its pivot axis, said means being adjustable to change the amount of movement of said gaging block necessary to open said trap door.

13. In a gaging machine, a pivoted gaging block, electrical contact members operatively connected to said block and separated by said block in moving a predetermined amount in either direction about its pivot axis, a relay magnet in circuit with said contact members and having relay contact members brought together when said relay magnet is deënergized, a trap door, and electro-magnets for releasing said trap door, said electro-magnets being in circuit with said relay contacts.

14. In a gaging machine, a pivoted gaging block, means connected to said block on each side of the pivot axis thereof, and operated by said block in moving in either direction about said pivot axis, a trap door, and electrically controlled means operated by said means for releasing said trap door.

15. A gaging machine comprising a horizontal circular way, a gaging block movably mounted in said way, means for guiding rolls on said way at fixed distances apart, a vertical shaft mounted in vertically spaced bearings, said bearings being adjustable in opposite directions horizontally, means for rotating said shaft, and a dome secured to the upper part of said shaft and resting upon the rolls of said way.

16. A gaging machine comprising a horizontal circular way, a gaging block movably mounted in said way, means for guiding rolls on said way at fixed distances apart, a shaft mounted to rotate vertically, means for rotating said shaft and permitting said shaft to have a vertical movement, and a dome secured to said shaft and resting upon the rolls on said way.

17. In a gaging machine, a body, a horizontal circular way removably secured to said body, a pivoted gaging block in said way, means for guiding rolls on said way at fixed distances apart, a vertical rotating shaft mounted in said body and free to move vertically, a dome fixedly secured to said shaft and resting on the rolls on said way, said way being formed with its uppermost point at said gaging block.

18. In a gaging machine, a gaging member pivoted on a transverse axis, means for positioning rolls one at a time with said gaging member with the axis of each roll extending longitudinally of said gaging member, means operable by said gaging member for automatically separating the rolls that move said gaging member about its pivot axis from the other rolls, said means being adjustable to change the amount of movement of said gaging member necessary to operate said means.

19. In a gaging machine, a body, a way removably secured to said body, a gaging member movably mounted in said way, means for positioning a roll on said gaging member, a member mounted to move in a straight line to and from the surface of said gaging member and provided with a surface adapted to engage a roll on said gaging member, and press said roll against said gaging member, and means operable by said gaging member in moving for automatically separating the rolls that move said gaging member from the other rolls.

20. In a gaging machine, a way, a pivoted gaging member, means for rolling rolls along said way and over said gaging member, levers operatively connected to said gaging member on each side of the pivot axis thereof, an electrical circuit controlled by said levers and electrically operated means included in said circuit for removing from said way the rolls that move said gaging member.

21. In a gaging machine, a way, a carrier for rolling rolls along said way, a pivoted gaging member in said way, a trap door in said way over which each of said rolls pass after passing over said gaging member, means operable by said gaging member for opening said trap door, and means on said carrier for closing said trap door.

22. In a gaging machine, a horizontal circular way, gaging means located adjacent to said way, a carrier mounted to rotate concentrically with said way, carrier arms secured to said carrier, and having spaced fingers adapted to receive a roll between them, a shaft mounted eccentrically with said way to rotate vertically, means for rotating said shaft and permitting said shaft to move vertically, and a dome secured to said shaft and resting upon the rolls on said way.

23. In a gaging machine, a gaging member pivoted on a line extending transversely thereof, means for positioning a roll on said gaging member with the axis of said roll extending longitudinally of said gaging member, and an electrical circuit controlled by a movement of said gaging member.

24. A gaging machine comprising means for gaging the taper of rolls, and automatic means coöperating with said first-mentioned means for separating the rolls varying from a predetermined taper from the other rolls.

25. In a gaging machine, a way, a gaging member movably mounted in said way, means for moving rolls along said way and into contact with said gaging member, said gaging member being adapted to engage the circumferential face of each roll near the ends thereof and to be moved by the roll engaged by said gaging member when the ratio of the end diameters of that roll varies from a predetermined ratio and means operable to remove from said way a roll, said means being operated by the movement of said gaging member.

Signed at Canton, Ohio, this 31st day of January, 1914.

JOHN F. FLAHERTY.

Witnesses:
 DAVID B. DAY,
 J. G. OBERMIER.